US009191102B2

(12) United States Patent
Joffe et al.

(10) Patent No.: US 9,191,102 B2
(45) Date of Patent: Nov. 17, 2015

(54) SYSTEMS AND METHODS FOR REDUCING THERMAL TAILS ON OPTICAL TIME DOMAIN REFLECTOMETER (OTDR) MEASUREMENTS

(71) Applicants: Daniel M. Joffe, Owens Crossroads, AL (US); Leif J. Sandstrom, Madison, AL (US)

(72) Inventors: Daniel M. Joffe, Owens Crossroads, AL (US); Leif J. Sandstrom, Madison, AL (US)

(73) Assignee: ADTRAN, Inc., Huntville, AL (US)

( * ) Notice: Subject to any disclaimer, the term of this patent is extended or adjusted under 35 U.S.C. 154(b) by 13 days.

(21) Appl. No.: 13/786,636

(22) Filed: Mar. 6, 2013

(65) Prior Publication Data
US 2013/0251363 A1  Sep. 26, 2013

Related U.S. Application Data

(60) Provisional application No. 61/607,374, filed on Mar. 6, 2012.

(51) Int. Cl.
*H04B 10/08* (2006.01)
*H04B 17/00* (2015.01)
*H04B 10/071* (2013.01)
*G01M 11/00* (2006.01)

(52) U.S. Cl.
CPC ......... *H04B 10/071* (2013.01); *G01M 11/3118* (2013.01); *G01M 11/3154* (2013.01)

(58) Field of Classification Search
USPC .................................... 398/10, 17, 21, 25, 28
See application file for complete search history.

(56) References Cited

U.S. PATENT DOCUMENTS 5,966,206 A * 10/1999 Jander .......................... 356/73.1
5,995,276 A * 11/1999 Tajima et al. ............. 359/337.12
6,137,605 A * 10/2000 Watanabe ......................... 398/1
6,259,553 B1 * 7/2001 Kinoshita ...................... 359/337

(Continued)

FOREIGN PATENT DOCUMENTS

EP          1248389       11/2008
JP       2001-141830       5/2001
KR    10-2011-0047484       5/2011

OTHER PUBLICATIONS

International Search Report issued by the Korean Intellectual Property Office as the International Searching Authority for International Application No. PCT/US2013/029385, entitled Systems and Methods for Reducing Thermal Tails on Optical Time Domain Reflectometer (OTDR) Measurements; Byun, Sung Cheal (Jun. 19, 2013).

(Continued)

*Primary Examiner* — David Payne
*Assistant Examiner* — Pranesh Barua
(74) *Attorney, Agent, or Firm* — Maynard Cooper & Gale, P.C.; Jon E. Holland

(57) ABSTRACT

An optical communication system has a power dissipating element that is thermally coupled to an optical transmitter. The currents supplied to the transmitter and the power dissipating element are controlled such that the sum of such currents is constant. Accordingly, temperature fluctuations in the transmitter due to patterns in the transmitted data are prevented or at least reduced, thereby reducing thermal tails on measurements. In one exemplary embodiment, a light source is used as the power dissipating element, and the output of such light source is beneficially used to probe another optical fiber or to enhance the OTDR performance or analysis.

21 Claims, 5 Drawing Sheets

(56) References Cited

U.S. PATENT DOCUMENTS

| | | | |
|---|---|---|---|
| 6,282,017 B1* | 8/2001 | Kinoshita | 359/341.42 |
| 6,483,617 B1* | 11/2002 | Roberts | 398/29 |
| 6,522,796 B1* | 2/2003 | Ziari et al. | 385/11 |
| 6,784,746 B1 | 8/2004 | Wuppermann | |
| 7,313,156 B2 | 12/2007 | Fujii et al. | |
| 7,504,886 B2 | 3/2009 | Kataria | |
| 7,514,997 B2 | 4/2009 | Adut | |
| 2002/0089736 A1* | 7/2002 | Aoki et al. | 359/326 |
| 2003/0170028 A1* | 9/2003 | Mori et al. | 398/79 |
| 2004/0146305 A1* | 7/2004 | Neubelt et al. | 398/173 |
| 2006/0182439 A1 | 8/2006 | Hernandez | |
| 2007/0086495 A1 | 4/2007 | Sprague et al. | |
| 2007/0160124 A1* | 7/2007 | Dorr | 375/222 |
| 2007/0197169 A1* | 8/2007 | Viss | 455/67.14 |
| 2008/0031624 A1* | 2/2008 | Smith et al. | 398/71 |
| 2009/0175627 A1* | 7/2009 | Yu | 398/141 |
| 2010/0014071 A1* | 1/2010 | Hartog | 356/73.1 |
| 2010/0271622 A1* | 10/2010 | Hori | 356/73.1 |
| 2011/0013904 A1* | 1/2011 | Khermosh et al. | 398/16 |
| 2011/0141457 A1* | 6/2011 | Levin et al. | 356/73.1 |
| 2011/0199607 A1 | 8/2011 | Kanellopoulos et al. | |
| 2011/0211827 A1* | 9/2011 | Soto et al. | 398/25 |
| 2011/0274426 A1* | 11/2011 | Yang | 398/16 |
| 2011/0280588 A1* | 11/2011 | Mikkelsen et al. | 398/202 |
| 2012/0020672 A1* | 1/2012 | Aguren | 398/139 |
| 2012/0087655 A1* | 4/2012 | Neilson et al. | 398/34 |
| 2012/0114339 A1* | 5/2012 | Yu | 398/182 |
| 2012/0148241 A1* | 6/2012 | Piehler et al. | 398/49 |
| 2012/0243863 A1* | 9/2012 | Zhao et al. | 398/16 |

OTHER PUBLICATIONS

English translation of Abstract for KR 10-2011-0047484.
English translation of Abstract for JP 2001-141830.

\* cited by examiner ly used.
SYSTEMS AND METHODS FOR REDUCING THERMAL TAILS ON OPTICAL TIME DOMAIN REFLECTOMETER (OTDR) MEASUREMENTS

CROSS REFERENCE TO RELATED APPLICATION

This application claims priority to U.S. Provisional Patent Application No. 61/607,374, entitled "Preventing Thermal Tails in OTDRs" and filed on Mar. 6, 2012, which is incorporated herein by reference.

RELATED ART

Optical time domain reflectometers (OTDRs) for detecting fiber anomalies have been developed and successfully used. An OTDR typically transmits light along an optical fiber, and portions of the light are returned toward the transmitter from points along the optical fiber. Such returns are produced by scattering of the light (Rayleigh backscatter) all along the length of the fiber and in some cases by localized reflections (Fresnel reflections) at particular points along the fiber. At an anomaly, such as a degraded splice, more attenuation may occur as light passes through the splice, or in some cases more light may be reflected at this point than at other points that are free of anomalies. The OTDR measures the light returned from points along the length of the fiber and creates a display of the intensity of light reflected from each point of the fiber. This display allows users to detect anomalies.

One type of OTDR is a correlation OTDR, which transmits a pseudo noise (PN) sequence, such as an M sequence, along the optical fiber. The returns from the optical fiber are correlated with a delayed version of the transmitted PN sequence to provide correlation values that correspond to points along the fiber and indicate whether an anomaly exists at each corresponding fiber location. In this regard, samples of the optical returns and a delayed PN sequence are input into a bank of correlators for which each correlator corresponds to a discrete delay and, hence, location on the fiber. The delayed PN sequence is stepped through a delay line, and for each step, each correlator correlates (i.e., multiplies and accumulates) a respective value of the delayed PN sequence with a sample of the optical returns currently received from the fiber thereby outputting a correlation value. If an anomaly exists at the fiber location corresponding to a particular correlator, the value in the correlator should accumulate to a different value making detection of the anomaly possible.

To quickly achieve accurate results and prevent false detections of anomalies, the return signals measured by the OTDR should have a relatively high signal-to-noise ratio (SNR). However, the OTDR return signals typically have small amplitudes and, thus, are susceptible to being obscured by relatively small amounts of noise. Techniques for improving the SNR of OTDR signals without significantly degrading the performance or increasing the cost of the OTDR are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

It has been observed that changes in the data transmitted by an optical transmitter, such as a laser, results in small temperature fluctuations in the transmitter. In this regard, the temperature of the transmitter generally rises when it transmits a sequence having a large number of binary high values (e.g., 1's), and the temperature of the transmitter generally falls when it transmits a sequence having a large number of binary low values (e.g., 0's). Such temperature changes, though small, affect the efficiency with which the transmitter converts current to light, thereby leading to pattern-dependent or correlated changes in output level. In a correlation optical time domain reflectometer (OTDR) system, the temperature fluctuations of the transmitter have been observed to produce a tail on measurements, referred to herein as "thermal tail," that reduces the signal-to-noise ratio (SNR) and obscures quick drops (attenuation events) in the OTDR channel. Such thermal tail is dependent on the correlation sequence used by the OTDR and, thus, is deterministic. Accordingly, averaging is generally ineffective for suppressing the thermal tail, which fundamentally limits OTDR performance by imposing a ceiling on OTDR dynamic range.

The present disclosure generally pertains to systems and methods for reducing thermal tails on optical time domain reflectometer (OTDR) measurements. In one exemplary embodiment, an optical communication system has a power dissipating element, such as a diode, resistive element, or light source (e.g., laser), that is thermally coupled to an optical transmitter. The currents supplied to the transmitter and the power dissipating element are controlled such that the sum of such currents is constant. Accordingly, temperature fluctuations in the transmitter due to patterns in the transmitted data are prevented or at least reduced, thereby reducing thermal tails on measurements. In one exemplary embodiment, a light source is used as the power dissipating element, and the output of such light source is beneficially used to probe another optical fiber or to enhance the OTDR performance or analysis.

Figure 1:
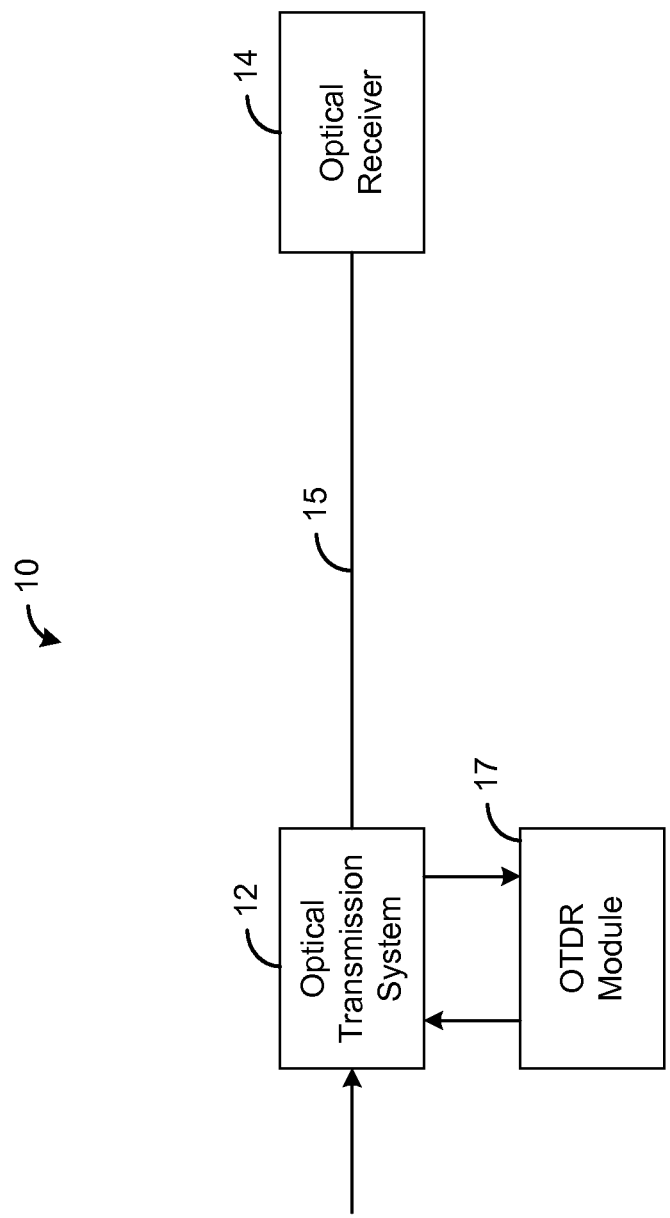
FIG. 1 is a block diagram illustrating an exemplary embodiment of an optical communication system having an optical time domain reflectometer (OTDR) for probing an optical fiber.

FIG. 1 depicts an exemplary embodiment of an optical communication system 10. The system 10 comprises an optical transmission system 12 coupled to an optical receiver 14 via an optical fiber 15. The optical transmission system 12 is configured to transmit optical signals to the optical receiver 14 via the fiber 15 and to receive optical signals (e.g., optical returns) from the fiber 15. The system 10 also comprises an optical time domain reflectometer (OTDR) module 17 coupled to the optical transmission system 12. The OTDR module 17 is configured to receive measurements of optical returns from the optical transmission system 12 and to facilitate detection of anomalies, such as, for example, degraded splices, along the optical fiber 15 based on the returns.

In this regard, light generally scatters and reflects from points along the fiber 15 as the light propagates, but light is typically reflected differently at a line anomaly, such as a degraded splice, depending on anomaly type. As an example, more attenuation may occur at locations of some anomalies, and more light may be reflected at locations of other anomalies. In one exemplary embodiment, a pseudo-random (PN) sequence, such as an M-sequence, is transmitted through the fiber 15, and the OTDR module 17 correlates samples of the optical returns with a delayed version of the transmitted sequence for facilitating identification of points along the fiber 15 that return unexpected amounts of light. Exemplary embodiments of OTDRs are described in commonly-assigned U.S. patent application Ser. No. 12/783,999, entitled "Systems and Methods for Unobtrusively Testing Optical Fibers" and filed on May 20, 2010, which is incorporated herein by reference.

Figure 2:
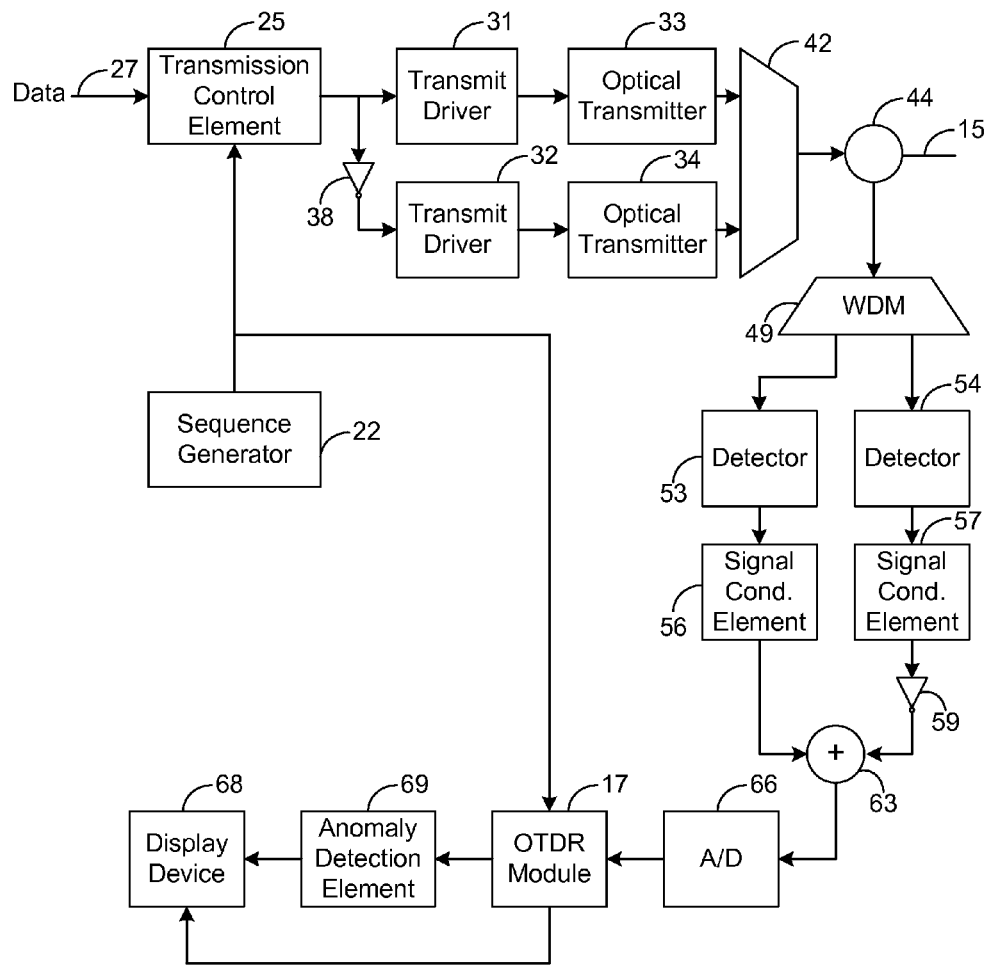
FIG. 2 is a block diagram illustrating an exemplary embodiment of an optical transmission system and OTDR, such as is depicted by FIG. 1, for probing an optical fiber.

FIG. 2 depicts an exemplary embodiment of the optical transmission system 12 and the OTDR module 17. As shown by FIG. 2, a sequence generator 22 is coupled to a transmission control element 25 that receives a digital data stream 27 for transmission to the optical receiver 14 (FIG. 1). The sequence generator 22 generates a PN sequence, such as an M-sequence, that is used to probe the fiber 15 for anomalies. Such sequence is provided to the OTDR module 17, which correlates the transmitted sequence with measurements of optical returns to provide correlation values indicative of locations of anomalies along the fiber 15 through techniques known in the art.

The transmission control element 25 transmits digital data to transmit drivers 31 and 32 that are used to drive optical transmitters 33 and 34 (e.g., lasers), respectively. The element 25 may control the data transmitted to the drivers 31 and 32 in various ways. As an example, the element 25 may selectively transmit the sequence from the generator 22 or the digital data stream 27 such that only one of the correlation sequence or the stream 27 is transmitted at a time in either a data mode or testing mode. In another embodiment, the element 25 combines the sequence and the data stream 27 such that they are both simultaneously transmitted through the fiber 15. As an example, the data stream may be amplitude modulated with the sequence, as described in U.S. patent application Ser. No. 12/783,999. Yet other techniques may be used for controlling the data output by the element 25.

As shown by FIG. 2, the data transmitted by the element 25 passes through an inverter 38 before being received by the transmit driver 32. Thus, at any given time, the binary value transmitted by the transmitter 34 should be opposite to the binary value transmitted by the transmitter 33. That is, the digital signal transmitted by the transmitter 34 is inverted with respect to the signal transmitted by the transmitter 33. As an example, when the transmitter 33 is transmitting a logical 1, the transmitter 34 should be transmitting a logical 0 and vice versa. Thus, regardless of the data pattern, the sum of the currents through the transmitters 33 and 34 and, hence, the total power dissipated by both transmitters 33 and 34 should be constant, assuming that the transmitters 33 and 34 have similar power dissipation characteristics. In addition, the transmitter 34 is thermally coupled to the transmitter 33. As an example, the transmitters 33 and 34 may reside on the same thermally conductive chip. In an alternative embodiment, the transmitters 33 and 34 may reside on separate chips provided that they are thermally coupled. As an example, the transmitters 33 and 34 may reside on separate chips with thermally conductive material extending from one transmitter 33 to the other 34.

By keeping the total power dissipated by both transmitters constant while they are thermally coupled to one another, temperature fluctuations in the transmitters 33 and 34 due to changes in the transmitted data patterns should be prevented or at least reduced to an extent depending on the quality of the thermal connection between the transmitters 33 and 34. Therefore, thermal tails on the measurements used by the OTDR module 17, as will be described in more detail hereafter, should be prevented or at least reduced.

In one exemplary embodiment, the wavelength of light emitted by the transmitter 33 is different than the wavelength of light emitted by the transmitter 34 so that light from both transmitters 33 and 34 can simultaneously probe the same fiber 15 and then later be separated for analysis, as will be described in more detail hereafter. As shown by FIG. 2, the transmitters 33 and 34 are optically coupled to the fiber 15 through a combiner 42 and a directional coupler 44. The combiner 42 combines the light from the transmitter 33 with the light from the transmitter 34 so that light from both transmitters 33 and 34 propagate along the fiber 15 at the same time.

The directional coupler 44 allows light from the combiner 42 to pass to the fiber 15. The light backscatters and reflects at points all along the fiber 15 and returns to the directional coupler 44, which directs such returns to the wave division multiplexer 49 while blocking the returns from reaching the combiner 42 and transmitters 33 and 34. The wave division multiplexer 49 is configured to separate, based on wavelength, the returns for light transmitted by the transmitter 33 from the returns for light transmitted by the transmitter 34. Thus, the optical returns for the transmitter 33 are received and detected by a detector 53 (e.g., a photodiode), and the optical returns for the transmitter 34 are received and detected by a detector 54 (e.g., a photodiode). The detector 53 converts the received optical returns into an electrical signal that is conditioned (e.g., amplified and filtered) by a signal conditioning element 56 in an effort to enhance signal quality, and the detector 54 converts the received optical returns into an electrical signal that is conditioned by a signal conditioning element 57 in an effort to enhance signal quality. The electrical signals output by the detectors 53 and 54 are indicative of the optical returns and shall be referred to herein as "return signals."

An inverter 59 receives and inverts the return signal output by the signal conditioning element 57. A signal combiner 63 receives and combines (e.g., sums) the return signal from the inverter 59 with the return signal from the signal conditioning element 56.

Due to the inverter 38, the signal transmitted by the transmitter 34 should be inverted with respect to the signal transmitted by the transmitter 33, as described above. The inverter 59 reverses this inversion so that the output of the inverter 59 should correspond to the output of the signal conditioning element 56. That is, the output of the inverter 59 should vary proportionally to the output of the signal conditioning element 56, though there may be a small amount of skew introduced in the optical path. In this regard, light at different wavelengths propagates at slightly different speeds through the fiber 15 thereby introducing a small amount of skew in the optical signal transmitted by the transmitter 34 relative to the optical signal transmitted by the transmitter 33. Such skew can generally be reduced by reducing the wavelength separation of such signals.

In any event, as described above, the inverter 59 inverts the return signal from the signal conditioning element 57 so that the operation performed by the signal combiner 63 increases signal power. In this regard, the signal combiner 63 constructively superimposes the return signal from the inverter 59 with the return signal from the element 56 such that the power of the combined signal output from the combiner 63 is increased. Therefore, the power of such combined signal should be higher than the power of either of the return signals input to the signal combiner 63. This combined signal is essentially a high-power return signal indicative of the optical returns detected by the detectors 56 and 57 and having a higher signal-to-noise ratio (SNR) relative to either of the return signals input to the combiner 63. Such improved SNR increases the performance of the OTDR module 17 helping to more accurately detect fiber anomalies, as will be described in more detail below.

The high-power return signal from the signal combiner 63 is converted from an analog signal to a digital signal by a digital-to-analog (ND) converter 66, and this digital signal is received for processing by the OTDR module 17. In this regard, as described above, the OTDR module 17 correlates (e.g., multiplies and accumulates) samples of the digital signal from the ND 66 with a delayed version of the correlation sequence generated by the sequence generator 22 to provide correlation values that can be analyzed to identify locations of anomalies along the fiber 15. If desired, the correlation values may be displayed by a display device 68 for viewing by a user who can identify an anomaly location based on the displayed values.

In one embodiment, as shown by FIG. 2, an anomaly detection element 69 is configured to receive the correlation values from the OTDR module 17 and to analyze such values to automatically detect anomalies along the fiber 15. Such anomaly detection element 69 can be implemented in hardware, software, firmware, or any combination thereof. In one embodiment, the anomaly detection element 69 is implemented in software and stored in memory (not shown) for execution by an execution apparatus (not shown), such as a digital signal processor (DSP). Upon detecting an anomaly, the anomaly detection element 69 displays via the display device 68 an indication of the anomaly including its estimated distance from the transmission system 12.

Accordingly, in the embodiment depicted by FIG. 2, the power dissipated by the transmitter 34 for preventing or reducing temperature fluctuations in the transmitter 33 is beneficially used to probe the fiber 15 with a signal of a different wavelength so that the returns from the transmitter 34 can be combined with the returns from the transmitter 33 in order to enhance the SNR of the return signal analyzed by the OTDR module 17. In other embodiments, the power dissipated by the transmitter 34 can be beneficially used in other ways.

Figure 3:
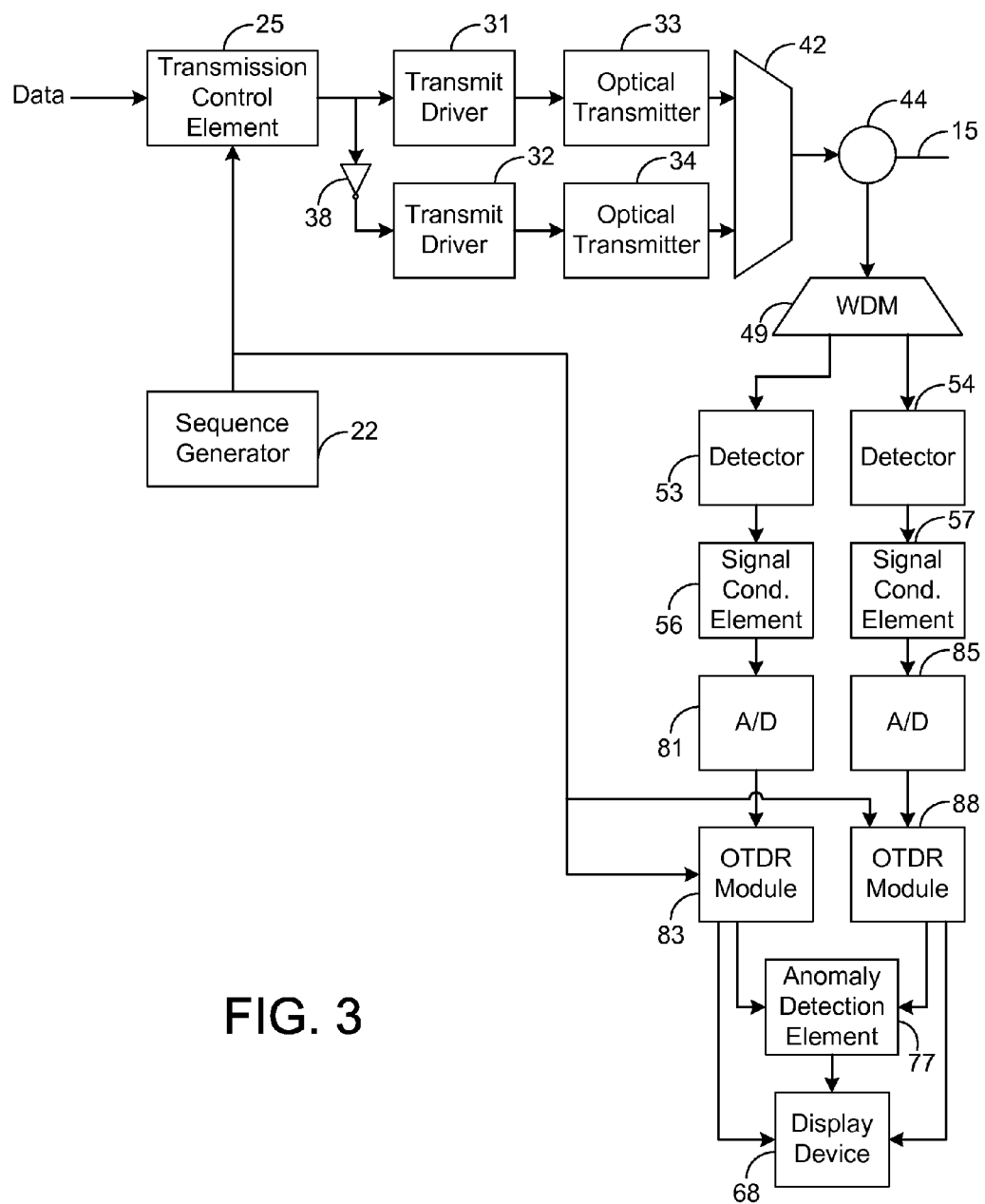
FIG. 3 is a block diagram illustrating an exemplary embodiment of an optical transmission system and OTDRs, such as is depicted by FIG. 1, for probing an optical fiber.

As an example, FIG. 3 depicts an exemplary embodiment that is used to provide additional data for improving the anomaly detection analysis performed by an anomaly detection element 77. The embodiment of FIG. 3 is configured the same and operates the same as the embodiment of FIG. 2 except as is otherwise described below. In this regard, the transmitter 34 in the embodiment of FIG. 3, like the transmitter 34 in the embodiment of FIG. 2, transmits an optical signal that is inverted and of a different wavelength relative to the optical signal transmitted by the transmitter 33, which is thermally coupled to the transmitter 34. Thus, temperature fluctuations in the transmitters 33 and 34 due to patterns in the transmitted data are prevented or at least reduced thereby reducing thermal tails on measurements. However, rather than combining the return signals via a signal combiner 63, as described above for the embodiment of FIG. 2, the return signals are kept separate prior to correlation by an OTDR module.

In this regard, the return signal from the signal conditioning element 56 is converted to a digital signal by an ND converter 81 before being received by an OTDR module 83. The OTDR module 83 is configured the same and operates the same as the OTDR 17 of FIG. 2. Thus, the OTDR module 83 correlates samples of the digital signal from the ND converter 81 with a delayed version of the sequence from the sequence generator 22 in order to provide correlation values that can be analyzed to detect fiber anomalies.

Similarly, the return signal from the signal conditioning element 57 is converted to a digital signal by an ND converter 85 before being received by an OTDR module 88. The OTDR module 88 is configured the same and operates the same as the OTDR module 17 of FIG. 2. Thus, the OTDR module 88 correlates samples of the digital signal from the ND converter 85 with a delayed version of the sequence from the sequence generator 22 in order to provide correlation values that can be analyzed to detect fiber anomalies.

The anomaly detection element 77 employs an algorithm that takes into account data from both the OTDR module 83 and the OTDR module 88 to more accurately detect anomalies along the fiber 15 relative to an embodiment that analyzes the data from only one of the OTDR modules 83 or 88. As an example, the OTDR results can be dependent on the wavelength of the light used to probe the fiber 15, and it is possible that some anomalies are more easily detected at certain wavelengths. Thus, probing the fiber 15 with more than one wavelength and then analyzing the results separately and/or averaging the results increases in some cases the accuracy of the decisions made by the anomaly detection element 77.

Figure 4:
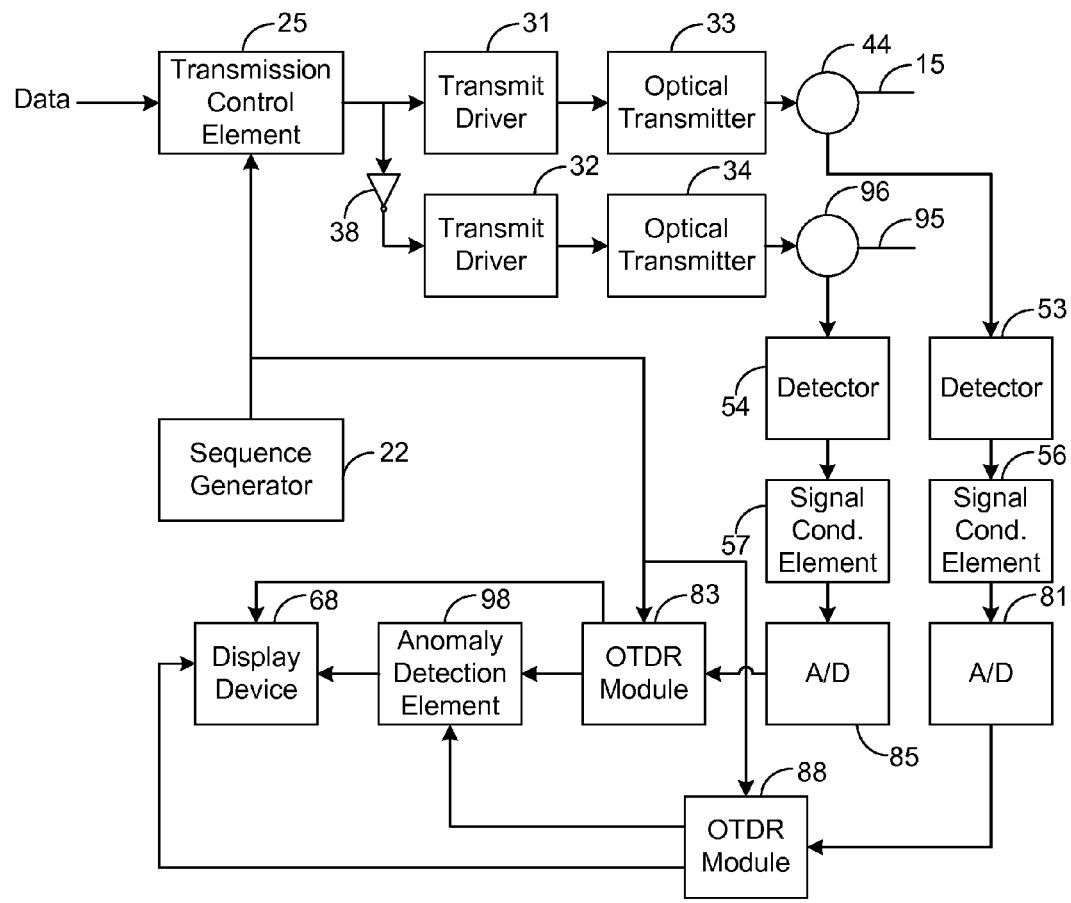
FIG. 4 is a block diagram illustrating an exemplary embodiment of an optical transmission system and OTDRs, such as is depicted by FIG. 1, for probing a plurality of optical fibers.

FIG. 4 depicts an exemplary embodiment in which the power dissipated by the transmitter 34 is beneficially used to probe a second optical fiber 95 that is coupled to the transmitter 34 through a directional coupler 96. In this regard, the transmitter 33 transmits a sequence through the fiber 15, and the transmitter 34 transmits an inverted version of the same sequence through the fiber 95. As described above, the transmitter 33 is thermally coupled to the transmitter 34. Thus, temperature fluctuations in the transmitters 33 and 34 due to data patterns are prevented or at least reduced thereby preventing or at least reducing thermal tails on the measurement data.

As shown by FIG. 4, optical returns from the fiber 15 are converted to an electrical signal by the detector 53, and the OTDR module 88 correlates samples from such signal with a delayed version of the transmitted sequence to determine correlation values indicative of any anomalies along the fiber 15. An anomaly detection element 98 analyzes such correlation values to detect at least one anomaly along the fiber 15, and the anomaly detection element 98 displays data indicative of such anomaly via the display device 68.

Similarly, optical returns from the fiber 95 are converted to an electrical signal by the detector 54, and the OTDR module 83 correlates samples from such signal with a delayed version of the transmitted sequence to determine correlation values indicative of any anomalies along the fiber 95. The anomaly detection element 98 analyzes such correlation values to detect at least one anomaly along the fiber 95, and the anomaly detection element 98 displays data indicative of such anomaly via the display device 68.

In the embodiments described above, it is assumed that the transmitters 33 and 34 have similar power dissipation characteristics such that driving the transmitter 34 with an inverse of the current used to drive the transmitter 33 results in constant power dissipation. However, in practice, mismatches in actual power dissipation may cause differences in power dissipation, thereby resulting in temperature fluctuations that are dependent on transmission patterns.

Figure 5:
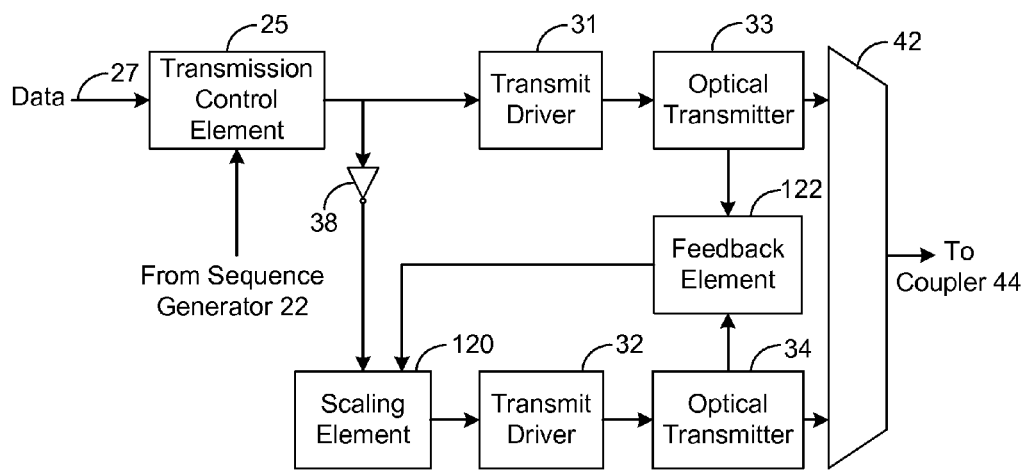
FIG. 5 is a block diagram illustrating an exemplary embodiment of a transmission system, such as is depicted by FIG. 1.

FIG. 5 depicts an exemplary embodiment of an optical transmission system 12 for which a scaling element 120 is used to adjust the current that passes through the transmitter 34 in an effort to keep the total power dissipated by the transmitters 33 and 34 constant despite differences in their actual power dissipation characteristics. In this regard, the element 120 scales the current passing through it based on feedback from a feedback element 122. The feedback element 122 is configured to measure a parameter for each of the optical transmitters 122 and to compare the measured parameters in order to determine how to adjust the scaling by the scaling element 120 in order to keep the total power dissipation by the transmitters 33 and 34 constant.

As an example, in one exemplary embodiment, the feedback element 122 comprises a thermistor (not shown) that is thermally coupled to and measures the temperature of the transmitter 33. The feedback element 122 also comprises a thermistor (not shown) that is thermally coupled to and measures the temperature of the transmitter 34. Based on the sensed temperatures, the feedback element 122 determines whether to adjust the scaling performed by the scaling element 120 and transmits a feedback signal to the element 120 for so adjusting the scaling.

One way to adjust the scaling is based on empirical data. As an example, the proper adjustments based on temperature may be empirically determined, and a table indicating how the scaling should be changed based on the temperature readings may be stored by the feedback element 122. During operation, the feedback element 122 determines how to adjust the scaling by comparing the measured temperature readings to the table. Alternatively, the feedback element 122 may implement an algorithm for calculating or otherwise determining the appropriate scaling adjustment based on temperature.

In another exemplary embodiment, the light output by the transmitters 33 and 34 may be sensed and used to determine scaling. As an example, in one exemplary embodiment, the feedback element has a detector (not shown), such as a photodiode, for sensing a portion of the light transmitted by the transmitter 33, and the feedback element also has a detector (not shown), such as a photodiode, for sensing a portion of the light transmitted by the transmitter 34. The intensity of the measured light generally indicates the power dissipated by the transmitter 33 or 34 that is transmitting it. Similar to the embodiment described above for thermistors, an empirically-determined table may be used to determine how the scaling should be adjusted based on the intensity of the measured light. Alternatively, the feedback element 122 may implement an algorithm for calculating or otherwise determining the appropriate scaling adjustment based on intensity.

In yet another exemplary embodiment, the transmitters 33 and 34 are placed in a first output state, and the die temperature for the transmitters 33 and 34 are measured. The transmitters 33 and 34 are then placed in a second output state, and the die temperature for the transmitters 33 and 34 is again measured. From those measurements, the relative currents for the transmitters 33 and 34 are adjusted (e.g., the desired scaling is established) to minimize the temperature difference between the two states.

Note that use of a feedback path for adjusting the scaling element is unnecessary. As an example, the scaling element 120 may be set to a desired scaling level during manufacturing without dynamically adjusting the scaling during operation. As an example, the transmitters 33 and 34 could be tested during manufacturing to determine their respective power dissipation characteristics, and a desired scaling level for the scaling element 120 could be selected and established based on the test results. Yet other techniques for determining the appropriate scaling are possible in other embodiments. Note that the scaling element 120, as shown by FIG. 5, may be implemented in any of the embodiments described herein.

It should be emphasized that the various embodiments described above are exemplary, and various changes and modifications to the described embodiments are possible. As an example, it is possible to use other types of power dissipation elements in lieu of the transmitter 34. As an example, the transmitter 34 could be replaced with a diode having similar voltage and current characteristics as the transmitter 33, or the transmitter 34 could be replaced with a resistive element that dissipates the same amount of power as the transmitter 33 during the application of complementary currents to the transmitter and resistive element. Various other changes and modifications would be apparent to a person of ordinary skill upon reading this disclosure.

Now, therefore, the following is claimed:

1. An optical communication system, comprising:
a first optical transmitter optically coupled to at least one optical fiber;
a first transmit driver configured to drive the first optical transmitter with a correlation sequence such that the first optical transmitter transmits the correlation sequence through the at least one optical fiber;
a second optical transmitter optically coupled to the at least one optical fiber and thermally coupled to the first optical transmitter;
a second transmit driver configured to drive the second optical transmitter based on the correlation sequence such that temperature fluctuations in the first optical transmitter are reduced; a first detector optically coupled to the at least one optical fiber and configured to detect returns of light from the first optical transmitter, the first detector configured to transmit a first electrical return signal indicative of the returns of light from the first optical transmitter; and
an optical time domain reflectometer (OTDR) module configured to determine values indicative of at least one anomaly along the at least one optical fiber based on the first electrical return signal.

2. The system of claim 1, wherein the at least one optical fiber comprises a first optical fiber and a second optical fiber, wherein the first optical transmitter is optically coupled to the first optical fiber, and wherein the second optical transmitter is optically coupled to the second optical fiber.

3. The system of claim 1, wherein the second driver is configured to drive the second optical transmitter with a correlation sequence that is inverted relative to the correlation sequence used by the first driver to drive the first optical transmitter.

4. The system of claim 1, wherein the second driver is configured to drive the second optical transmitter such that the total power dissipated by the first and second optical transmitters is constant.

5. The system of claim 1, further comprising:
a scaling element coupled to the second transmit driver, the scaling element configured to scale a current provided to the second transmit driver; and
a feedback element configured to measure at least one parameter indicative of the first and second optical transmitters and to transmit a feedback signal to the scaling element based on the at least one parameter.

6. The system of claim 1, wherein the at least one optical fiber comprises an optical fiber that is optically coupled to the first and second optical transmitters.

7. The system of claim 6, further comprising a second detector optically coupled to the at least one optical fiber and configured to detect returns of light from the second optical transmitter, the second detector configured to transmit a second electrical return signal indicative of the returns of light from the second optical transmitter.

8. The system of claim 7, further comprising a signal combiner configured to combine the first electrical return signal and the second electrical return signal thereby defining a combined return signal, wherein the OTDR module is configured to determine the values based on the combined return signal.

9. The system of claim 7, further comprising an OTDR module configured to determine values indicative of the at least one anomaly based on the second electrical return signal.

10. An optical communication system, comprising:
a first optical transmitter optically coupled to at least one optical fiber;
a first transmit driver configured to drive the first optical transmitter with a correlation sequence such that the first optical transmitter transmits the correlation sequence through the at least one optical fiber;
a second optical transmitter optically coupled to the at least one optical fiber and thermally coupled to the first optical transmitter;
a second transmit driver configured to drive the second optical transmitter such that a total power dissipated by the first and second optical transmitters is constant;
a first detector optically coupled to the at least one optical fiber and configured to detect returns of light from the first optical transmitter, the first detector configured to transmit a first electrical return signal indicative of the returns of light from the first optical transmitter; and
an optical time domain reflectometer (OTDR) module configured to determine values indicative of at least one anomaly along the at least one optical fiber based on the first electrical return signal.

11. The system of claim 10, wherein the at least one optical fiber comprises a first optical fiber and a second optical fiber, wherein the first optical transmitter is optically coupled to the first optical fiber, and wherein the second optical transmitter is optically coupled to the second optical fiber.

12. The system of claim 10, wherein the second driver is configured to drive the second optical transmitter with a correlation sequence that is inverted relative to the correlation sequence used by the first driver to drive the first optical transmitter.

13. The system of claim 10, wherein the at least one optical fiber comprises an optical fiber that is optically coupled to the first and second optical transmitters.

14. The system of claim 13, further comprising a second detector optically coupled to the at least one optical fiber and configured to detect returns of light from the second optical transmitter, the second detector configured to transmit a second electrical return signal indicative of the returns of light from the second optical transmitter.

15. The system of claim 14, further comprising a signal combiner configured to combine the first electrical return signal and the second electrical return signal thereby defining a combined return signal, wherein the OTDR module is configured to determine the values based on the combined return signal.

16. The system of claim 14, further comprising an OTDR module configured to determine values indicative of the at least one anomaly based on the second electrical return signal.

17. A method, comprising:
driving a first optical transmitter that is optically coupled to at least one optical fiber such that the first optical transmitter transmits a correlation sequence through the at least one optical fiber;
detecting returns of light transmitted by the first optical transmitter through the at least one optical fiber;
taking measurements of the returns with an optical time domain reflectometer (OTDR) module;
driving a second optical transmitter based on the correlation sequence such that temperature fluctuations in the first optical transmitter are reduced, thereby compensating for a thermal tail on the measurements, wherein the first optical transmitter is thermally coupled to the second optical transmitter;
determining, with the OTDR module based on the measurements, values indicative of at least one anomaly along the at least one optical fiber; and
detecting the at least one anomaly along the at least one optical fiber with the OTDR module based on the values.

18. The method of claim 17, wherein the driving the second optical transmitter is performed such that a total power dissipated by the first and second optical transmitters is constant.

19. The method of claim 17, further comprising inverting the correlation sequence thereby forming an inverted correlation sequence, wherein the driving the second optical transmitter comprises driving the second optical transmitter with the inverted correlation sequence.

20. The method of claim 17, further comprising:
providing a first electrical return signal indicative of the returns of the light transmitted by the first optical transmitter;
detecting returns of light transmitted by the second optical transmitter;
providing a second electrical return signal indicative of the returns of the light transmitted by the second optical transmitter; and
combining the first electrical return signal with the second electrical return signal thereby defining a combined return signal,
wherein the detecting the at least one anomaly is based on the combined return signal.

21. A method, comprising:
driving a first optical transmitter that is optically coupled to at least one optical fiber such that the first optical transmitter transmits a correlation sequence through the at least one optical fiber;
driving a second optical transmitter based on the correlation sequence such that temperature fluctuations in the first optical transmitter are reduced, wherein the first optical transmitter is thermally coupled to the second optical transmitter;
detecting, with a detector coupled to the at least one optical fiber, returns of light transmitted by the first optical transmitter through the at least one optical fiber;
transmitting, from the detector to an optical time domain reflectometer (OTDR) module, an electrical return signal indicative of the returns of light; and determining, with the OTDR module, values indicative of at least one anomaly along the at least one optical fiber based on the electrical return signal.

\* \* \* \* \*